United States Patent [19]

Tanaka

[11] Patent Number: 5,768,238
[45] Date of Patent: Jun. 16, 1998

[54] DISC-LOADING APPARATUS HAVING STRUCTURE WHICH FACILITATES SUB-CHASSIS/MAIN CHASSIS ASSEMBLY

[75] Inventor: Akira Tanaka, Chiba, Japan

[73] Assignee: Sony, Corporation, Japan

[21] Appl. No.: 703,893

[22] Filed: Aug. 27, 1996

Related U.S. Application Data

[63] Continuation of Ser. No. 389,944, Feb. 17, 1995, abandoned.

[30] Foreign Application Priority Data

Feb. 25, 1994 [JP] Japan .................................. 6-052770

[51] Int. Cl.$^6$ .................................................. G11B 17/04
[52] U.S. Cl. .......................... 369/75.2; 369/77.1
[58] Field of Search .............................. 369/75.2, 75.1, 369/77.1, 77.2; 360/97.01

[56] References Cited

U.S. PATENT DOCUMENTS 5,204,850  4/1993  Obata ........................................ 369/75.2
5,218,593  6/1993  Kane ......................................... 369/77.1
5,293,362  3/1994  Sakurai et al. ............................ 369/75.2

FOREIGN PATENT DOCUMENTS 64-31545  2/1989  Japan .

Primary Examiner—Stuart S. Levy
Assistant Examiner—William R. Korzuch
Attorney, Agent, or Firm—Ronald P. Kananen

[57] ABSTRACT

A sub-chassis is readily mounted on a main chassis by pivot shafts (3a) which can be axially inserted into pivot support bores formed in the main chassis (1). A cam member (2) is provided with a cam groove (2b) for inducing vertical pivotal movement of the sub-chassis (3). The sub-chassis (3) has an engaging portion (3b) which is engaged in a cam which has a cam groove (2b). The cam is provided with a notch (2c) via which the engaging portion (3b) of the sub-tray (3) can enter the cam groove. A limiting projection 1f is provided which prevents the shafts (3a) of the sub-tray (3) from disengaging from the main chassis (1) while the sub-chassis is pivoting within an operative range.

15 Claims, 9 Drawing Sheets

CLOSED POSITION (2)
(STANBY)

The front side of the subchasis
is tilted downward

PLAYBACK POSITION (3)

5,768,238

DISC-LOADING APPARATUS HAVING STRUCTURE WHICH FACILITATES SUB-CHASSIS/MAIN CHASSIS ASSEMBLY

This application is a continuation of application Ser. No. 08/389,944 filed Feb. 17, 1995 abandoned.

BACKGROUND OF THE INVENTION

The present invention relates to a disk-loading apparatus for moving an optical playback means or the like such as an optical pickup toward and away from a disk placed on a tray. More particularly, this invention relates to a disk-loading apparatus having a main chassis and a subchassis which rotates about pivots extending in the same axial direction as pivot-receiving openings in an extending portion of the main chassis, to facilitate assembly.

BRIEF DESCRIPTION OF THE RELEVANT ART

A CD player, for example, is equipped with a disk-loading apparatus for moving an optical pickup or turntable toward and away from a disk placed in its closed position, or play position, on a tray. This disk-loading apparatus comprises, for example, a subchassis and a cam member. One end of the sub-chassis is rotatably mounted to a main chassis that is the body of the player, the other end of the sub-chassis being swingable up and down. The cam member swings the other end of the sub-chassis up and down.

FIG. 1 is a view illustrating a method of mounting the prior art disk-loading apparatus to the main chassis of a CD player. In shown in the figure, a sub-chassis 100 includes a pair of axially oppositely-directed pivots 100a for rotation of the sub-chassis about the pivots 100a. The pivots 100a are formed at the top and bottom ends of the upper right portion of the sub-chassis 100. A main chassis 101 includes a pair of bearing portions 101a for rotatably supporting the pivots 100a of the sub-chassis 100. The bearing portions 101a of the main chassis 101 are formed to mate with the pivots 100a at the upper right portion of the sub-chassis 100. The bearing portions 101a are open at their mutually-opposed inner sides and at their respective top sides for receiving therein the axially oppositely-directed pivots 100a of the subchassis 100. The main chassis 101 also defines an opening 101b for receiving the sub-chassis 100 when in its pivotally downward position. The sub-chassis 100 includes a forwardly-extending protrusion 100b formed on the leftmost forward portion of the subchassis 100 as viewed in FIG. 1.

A cam member 102 is mounted to the left side of the main chassis 101 as viewed in FIG. 1 The cam member 102 includes a cam groove 102a in engagement with a protrusion 100b formed at the left end of the sub-chassis 100. An optical pickup 106 and a turntable 107 are supported by the sub-chassis 100 and positioned to rotate a disk placed on the turntable 107 for sensing data from the disk by the optical pickup 106.

The sub-chassis 100 is mounted to the main chassis in the manner which is now described. First, the sub-chassis 100 is made to face an opening 101b in the main chassis 101. Under this condition, the protrusion 100b on the sub-chassis 100 is inserted into the cam groove 102a in the rotating cam 102. Then, the pivots 100a of the sub-chassis 100 are caused to fall into the bearing portions 101a in the main chassis 101 from a position above the bearing portions 101a. Thereafter, washers 103 and screws 104 are respectively mounted on each of the bearing portions 101a to prevent the sub-chassis 100 from disengaging from the main chassis 101. A gear 105 for rotating the cam member 102 is then mounted on the cam member 102.

FIG. 2 thus shows the condition in which the sub-chassis 100 is mounted in the main chassis 101 according to the assembly steps previously described. Under the illustrated condition, rotation of the gear 105 rotates the rotating cam member 102. The protrusion 100b on the subchassis 100 thus moves vertically along the cam groove 102a in the rotating cam member 102 when the cam member 102 is rotating. The right end of the sub-chassis 100 as viewed in FIG. 2 is rotatably held to the main chassis 101 by the pivots 100a mating with the bearing portions 101a. Therefore, rotation of the rotating cam member 102 causes the sub-chassis 100 to swing in an upwardly and downwardly direction as viewed in FIG. 2. Thus, the optical pickup 106 and the turntable 107 mounted to the sub-chassis 100 are also capable of moving toward and away from a disk placed in position on a tray 108 on the main chassis 101, as seen in FIG. 2.

The apparatus shown in FIGS. 1 and 2 has presented some difficulties in that the above-described disk-loading apparatus needs the washers 103 and the screws 104 when mounting and pivotally securing the sub-chassis 100 to the main chassis 101 because of the structure of the apparatus. Therefore, this disk-loading apparatus has a problem in involving an extra step for mounting the washers 103 and the screws 104. Furthermore, the number of components of this disk-loading apparatus is increased because of the presence of the washers 103 and the screws 104. These features increase the cost of parts and of their assembly.

BRIEF SUMMARY OF THE INVENTION

In view of the foregoing problems, it is an overall object of the present invention to provide an inexpensive disk-loading apparatus having a sub-chassis which can be easily mounted to a main chassis.

It is an additional object of this invention to provide, in accordance with the teachings of the invention, a disk-loading apparatus having a main chassis for supporting a tray on which a disk is placed and a sub-chassis rotating about shafts, so as to move toward and away from the main chassis, the apparatus being characterized in that rotating portions of the sub-chassis rotatably held by said shafts are moved along said shafts, whereby the rotating portions can be attached to and detached from the main chassis.

Directed to overcoming the problems with the prior art and to achieving the objects of this invention, an apparatus for loading a disk according to the invention has a tray on which the disk is placed; a main chassis for supporting the tray, wherein the main chassis comprises an opening portion, protruding portions protruding toward the opening portion which are respectively formed at a first end of the main chassis, and a pair of support holes formed in the protruding portions which have openings extending in the same direction. A subchassis rotates about pivots so as to move toward and away from the main chassis, which pivots have openings extending in the same direction in which the support holes in the main chassis extend and which are inserted into the support holes.

In the present invention, the sub-chassis preferably has an engaging portion for making engagement with the main chassis. The main chassis has a guide portion for guiding the engaging portion of the sub-chassis. Also, in the present invention, the guide portion of the main chassis preferably forms a cam portion provided with a cam groove. This cam portion is formed with a notch into which the engaging portion engaged in the cam groove is to be inserted. The cam gear has a cam member for swinging a second end of the subchassis up and down and a driving gear for moving the tray, the second end being opposite to the first end. The main chassis further comprises an installing portion for installing the cam gear and the subchassi further includes an engaging portion of making engagement with the main chassis and the engaging portion is guided by the cam member.

Furthermore, in the present invention, there are provided limiting means for preventing said rotating portions of the sub-chassis from disengaging from the main chassis within a range in which the sub-chassis rotates about the shafts. In addition, in the present invention, the limiting means preferably consist of protruding portions formed on either one of the sub-chassis and the main chassis.

Moreover, in the present invention, a moving means for moving the tray toward the main chassis is preferably formed integrally with the cam portion, and the disk is placed on the tray.

In the operation of the above-described structure, in order to mount the sub-chassis to the main chassis, the sub-chassis is first moved along the axis of its shafts. In this way, the rotating portions of the sub-chassis are mounted to the main chassis via its shafts. Then, the engaging portion of the sub-chassis is inserted into the cam groove via the notch formed in the cam portion while swinging the other end of the sub-chassis toward the main chassis. Under this condition, movement of the sub-chassis along the axis of its shafts is limited by the limiting means and so the rotating portions of the sub-chassis do not disengage from the main chassis. If the limiting means are composed of protrusions formed either on the sub-chassis or on the main chassis, the limiting means can be easily formed integrally with the sub-chassis or the main chassis. Furthermore, if a means for moving the tray is formed integrally with the cam member, then the timing at which the tray is moved can be easily correlated with the timing at which the sub-chassis is swung, owing to the shape of the cam groove.

These and other features of the invention will be seen from a detailed review of this written description of the invention, taken with the accompanying drawings.

DETAILED DESCRIPTION OF THE PREFERRED EMBODIMENT

A preferred embodiment of the invention is hereinafter described in detail with reference to FIGS. 3 to 11. Since an embodiment described below is a preferred specific example of the invention, various technically preferred limitations are imposed. However, the scope of the invention is not limited to these aspects unless otherwise specifically stated below.

Figure 3:
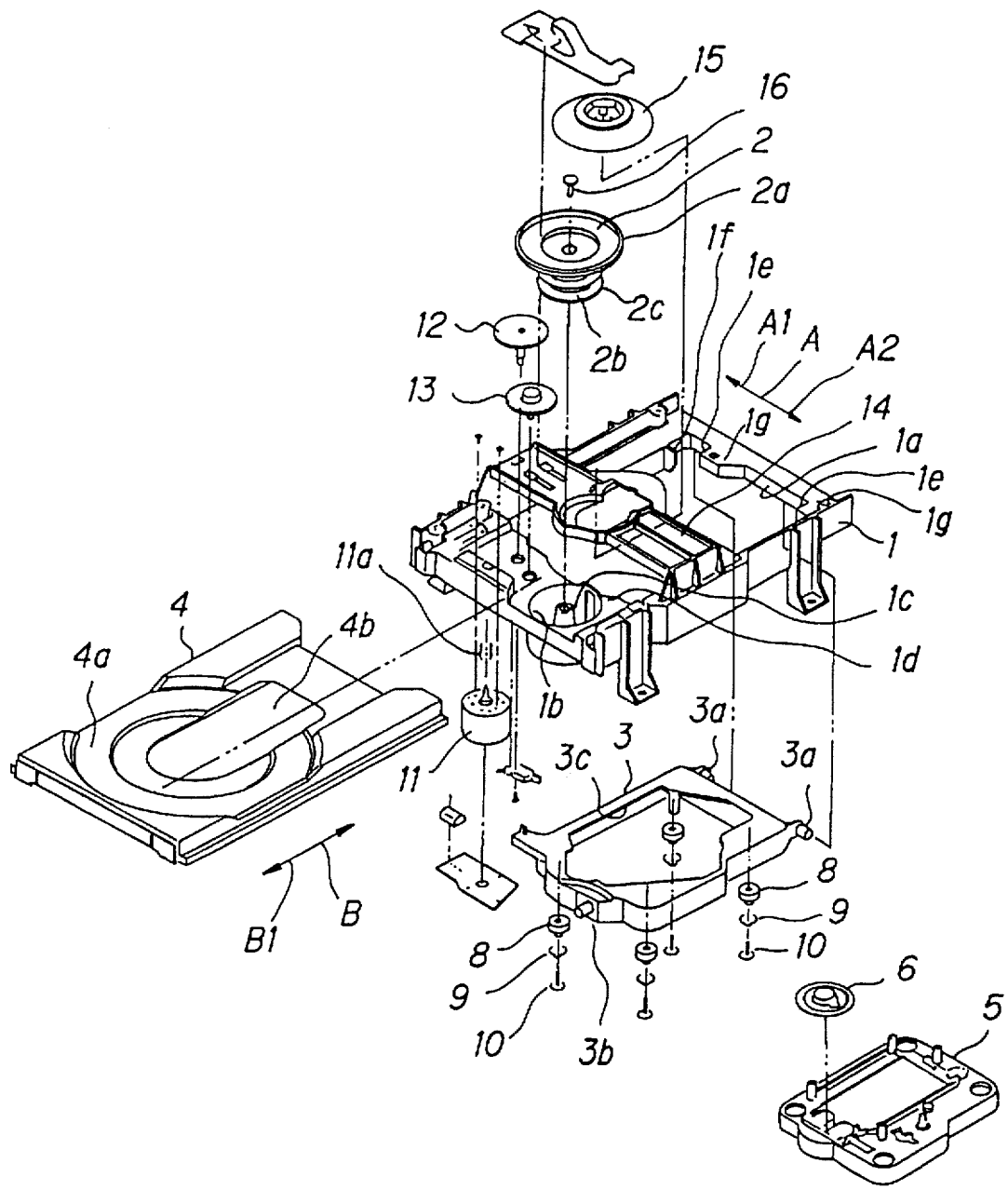
FIG. 3 is an exploded perspective view of main portions of a CD player incorporating a disk-loading apparatus forming a preferred embodiment of the invention.

FIG. 3 is an exploded perspective view of main portions of a CD player incorporating a disk-loading apparatus embodying the present invention. In FIG. 3, a main chassis is generally indicated by the reference numeral 1. As clearly shown in this figure, the main chassis 1 is centrally provided with an open portion 1a in the main chassis and also with an essentially cylindrical or well-shaped recessed portion 1b at the left (or front) side of the main chassis, as viewed in the figure. The well-shaped recessed portion 1b accommodates a cam gear 2. The main chassis 1 also includes a spindle-like protruding portion 1c which is formed in the center of the recessed portion 1b which mates with and rotatably supports the cam gear 2. The main chassis also includes a vertically-extending insertion opening portion 1d formed in a wall portion between the recessed portion 1b and the opening 1a in the main chassis 1. The main chassis further defines a pair of inwardly-directed, spaced-apart, protruding portions 1g protruding toward the opening 1a which are formed at the right (or rear) end of the main chassis 1 as viewed in the figure. A pair of support holes 1e for mounting a sub-chassis 3 are formed in the protruding portions 1g. The support holes 1e have openings extending in a direction indicated by the arrow A1, or transverse to the forward and rearward (left and right) directions.

The main chassis also includes a limiting protrusion 1f which is formed on the main chassis 1 near one of the support holes 1e. The protrusions 1f protrudes a given amount into the opening portion 1a in the direction A2.

A cam gear 2 is provided for swinging the left side (as viewed in the figure) of the sub-chassis 3 vertically relative to the main chassis 1. A driving gear 2a is provide for moving a tray 4 in the direction B1 indicated by the arrow B and is formed integrally with the cam gear 2. More specifically, the driving gear 2a for moving the tray 4 is formed on the upper side of the cam gear 2. A cam groove 2b for swinging the sub-chassis 3 up and down, as viewed in the figure, is formed in the lower outer surface of the cam gear 2 and is arranged to engage with a cam follower type of protrusion 3b on the sub-chassis 3 which protrudes forwardly from a front portion of the sub-chassis 3 as seen in the figure.

Figure 6:
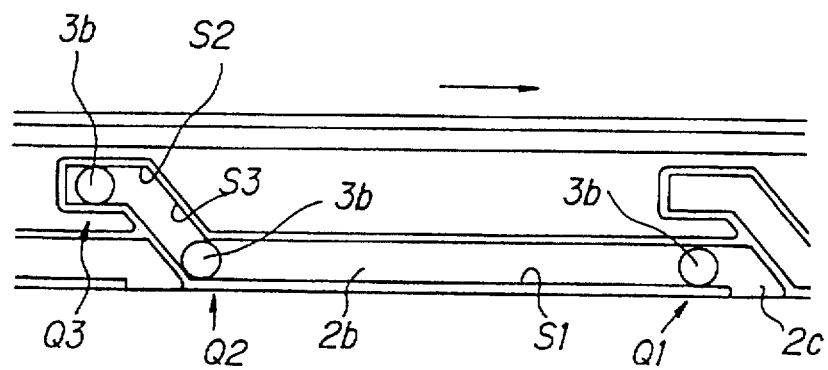
FIG. 6 is an expanded view of the cam groove in the cam gear of FIGS. 2 to 4.
Figure 7:
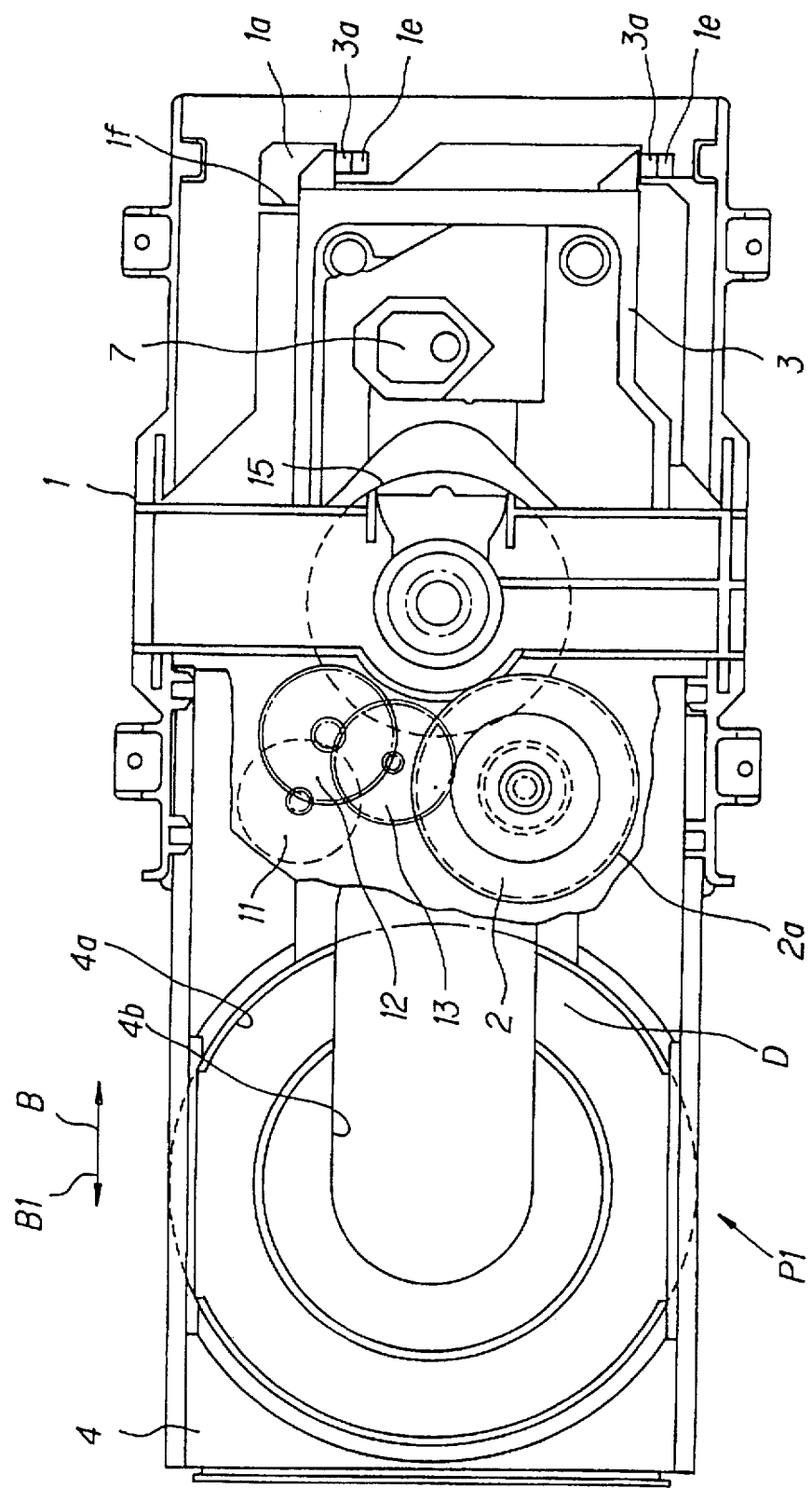
FIG. 7 is a transparent plan view of the CD player shown in FIG. 3, and in which the disk tray is in its open position.

As best shown in FIG. 6, the cam groove 2b comprises a lower step portion S1, an upper step portion S2, and an oblique of transition portion S3 connecting the lower step portion S1 and the upper step portion S2. The lower step portion S1 is longer than the upper step portion S2. A notch 2c in the cam gear 2 for introducing the protrusion 3b on the subchassis 3 into the cam groove 2b from below is formed in the bottom wall of the lower step portion S1 that is located immediately under the upper step portion S2 of the cam groove 2b.

On the other hand, as shown in FIG. 3, a pair of pivots 3a protruding in the direction A2 of the arrow A are formed at the right end of the sub-chassis 3. These pivots 3a each extend (viz., point) in the same axial direction A2, in contrast to the oppositely-directed pivots 100a shown in FIG. 1. The protrusion 3b which protrudes in the direction indicated by the arrow B1 is formed at the left end of the sub-chassis 3 and as will be appreciated from FIGS. 3 and 5, extends through a slot (no numeral) formed in the wall of the well-like recessed portion 1b, to operatively engage with the cam groove 2b. The sub-chassis 3 is centrally provided with an opening 3c.

A support base 5 for mounting a turntable 6 and an optical pickup 7 (see FIG. 7) is mounted to the bottom surface of the sub-chassis 3 so as to face the opening 3c in the sub-chassis 3. The support base 5 is secured to the sub-chassis 3 via vibration insulators 8, springs 9 and screws 10.

The disk-loading apparatus is composed of the cam gear 2 and the sub-chassis 3. The tray 4 moves on the main chassis 1 in the direction B1 of the arrow B to move the disk which is placed on the top surface of the tray 4, into an open position P1 shown in FIGS. 7 and 11 or into a closed position P2 shown in FIGS. 9 and 10.

As shown in FIG. 3, a concave disk placement portion or recess 4a is formed in the center of the movable tray 4. A slot 4b extends from the center of the disk placement portion 4a toward the main chassis 1. When the tray 4 is in the closed position P2, the slot 4b allows the turntable 6 and the optical pickup 7 to face the disk D (see FIG. 11) on the tray 4. As shown, the turntable 6 and the pickup 7 are mounted to the sub-chassis 3 via the support base 5 (FIG. 3).

Figure 4:
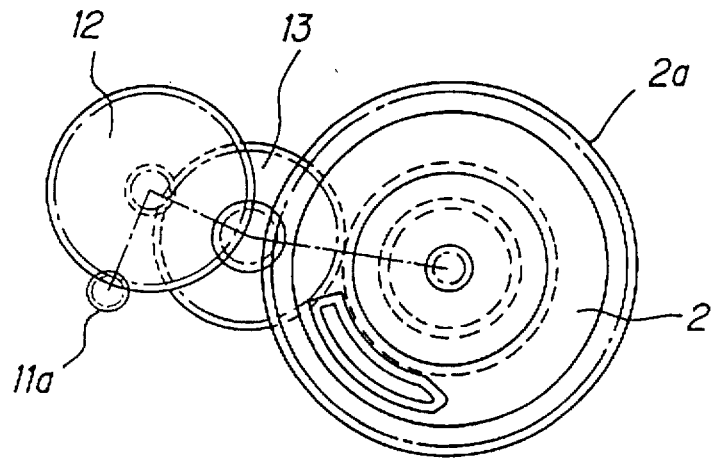
FIG. 4 is a diagrammitic, transparent plan view of the CD player shown in FIG. 3, showing a path along which power is transmitted to a cam gear.
Figure 5:
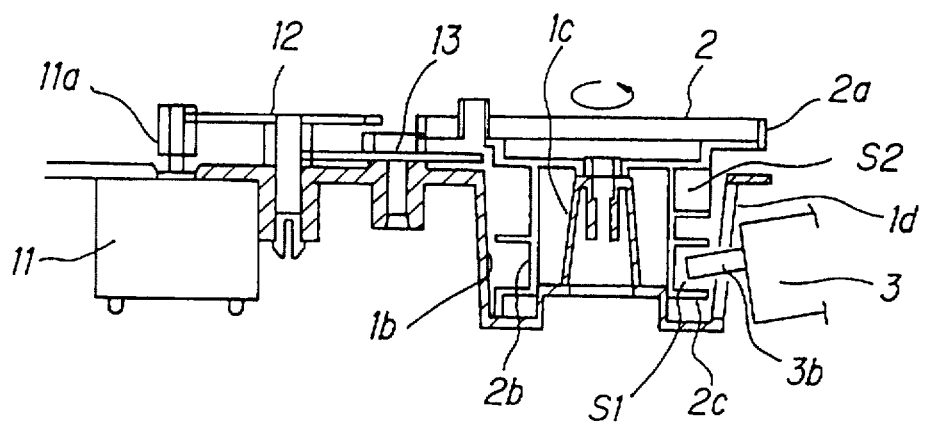
FIG. 5 is a cross-sectional, side elevational view of FIG. 4.

An electric motor 11, a first gear 12, and a second gear 13 are also mounted on the main chassis 1. AS shown in FIGS. 4 and 5, the rotational force of the motor 11 is transmitted from an output gear 11a of the motor 11 to the first gear 12. The rotational force is then transmitted from the first gear 12 to the second gear 13 and then to the cam gear 2 which includes the cam groove 2a.

A gate-shaped chucking beam 14 is transversely mounted on top of the main chassis 1. A chucking pulley 15 is rotatably mounted to the bottom surface of the chucking beam 14.

The procedure for mounting the sub-chassis to the main chassis 1 of the disk-loading apparatus is described below.

As shown in FIG. 3, the cam gear 2 is first inserted into the recessed portion 1b in the main chassis 1. The central portion of the cam gear 2 is positioned and held by the protruding portion 1c. Subsequently, a screw 16 (see FIG. 3) is screwed into the main chassis 1 via the cam gear 2 to secure the cam bear 2 to the protruding portion 1d. The cam gear 2 thus is rotatably secured to the main chassis 1. In this case, the notch 2c in the cam gear 2 is made to face the vertically-extending insertion opening 1d in the main chassis 1, as best seen in FIGS. 3 and 5.

The motor 11 with its output gear 11a, the first gear 12, and the second gear 13, as best seen in FIGS. 4 and 5, are mounted to the main chassis 1 prior to the mounting of the cam gear 2, as described above. Thereafter, the sub-chassis 3 is inserted into the opening portion 1a from below the main chassis 1 while causing the pivots 3a to face upward. The axis of the pivots 3a is brought into agreement or coincidence with the axis of the support holes 1e in the main chassis 1. Under this condition, the sub-chassis 3 is moved horizontally (viz., laterally) in the direction of A2 shown in FIG. 3, that is, in the same axial direction as the pivots 3a and coincidentally along the same axis. Then, the pivots 3a are inserted into the support holes 1e in the projecting portions 1g of the main chassis 1. One end of the sub-chassis 3, i.e. the right end as seen in FIG. 3, is thus is rotatably held to the main chassis 1.

Thereafter, the other end, i.e. the left end as seen in FIG. 3, of the sub-chassis 3 is rotated upward. The protrusion 3b is inserted into the recessed portion 1b in the main chassis 1 through the insertion opening 1d in the main chassis 1. In this case, the notch 2c in the cam gear 2 is located on the side of the insertion opening 1d in the main chassis 1 and so the protrusion 3b on the sub-chassis 3 is inserted into the cam groove 2b in the cam gear 2. The cam gear 2 is then slightly rotated to place the protrusion 3b formed on the sub-chassis 3 in a start position Q1 shown in FIG. 6.

Figure 11:
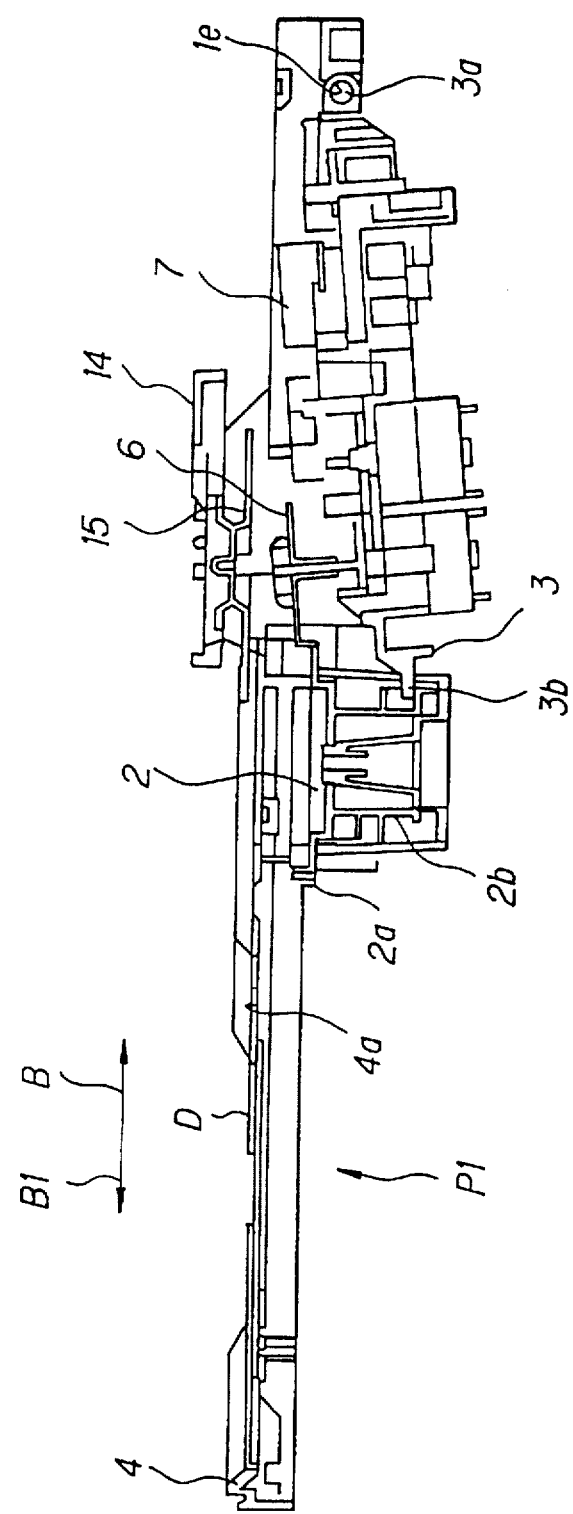
FIG. 11 is a side elevation in cross-section of FIG. 7.

Under this condition, the operation for mounting the sub-chassis 3 to the main chassis 1 is completed. Also, under this condition, movement of the sub-chassis 3 along the axis of the pivots 3a is restricted by the limiting protrusions 1f on the main chassis 1. That is, once the sub-chassis 3 is mounted to the main chassis 1, the sub-chassis does not come out of engagement with the main chassis 1. In this case, the protrusion 3b on the subchassis 3 is in engagement with the lower step portion S1 in the cam groove 2b shown in FIG. G. Therefore, one end of the sub-chassis 3 is tilted downward with respect to the other end, as shown in FIG. 11.

The support base 5, the turntable 6, the optical pickup 7, and other components may be mounted to the sub-chassis 3 either before or after the sub-chassis 3 is mounted to the main chassis 1. The tray 4 is mounted to the main chassis 1 when the tray is in the open position P1. In this case, the cam gear 2, for example, is brought into mesh with a rack (as shown in FIG. 8) formed on the bottom surface of the tray 4 without rotating the gear 2.

Figure 1:
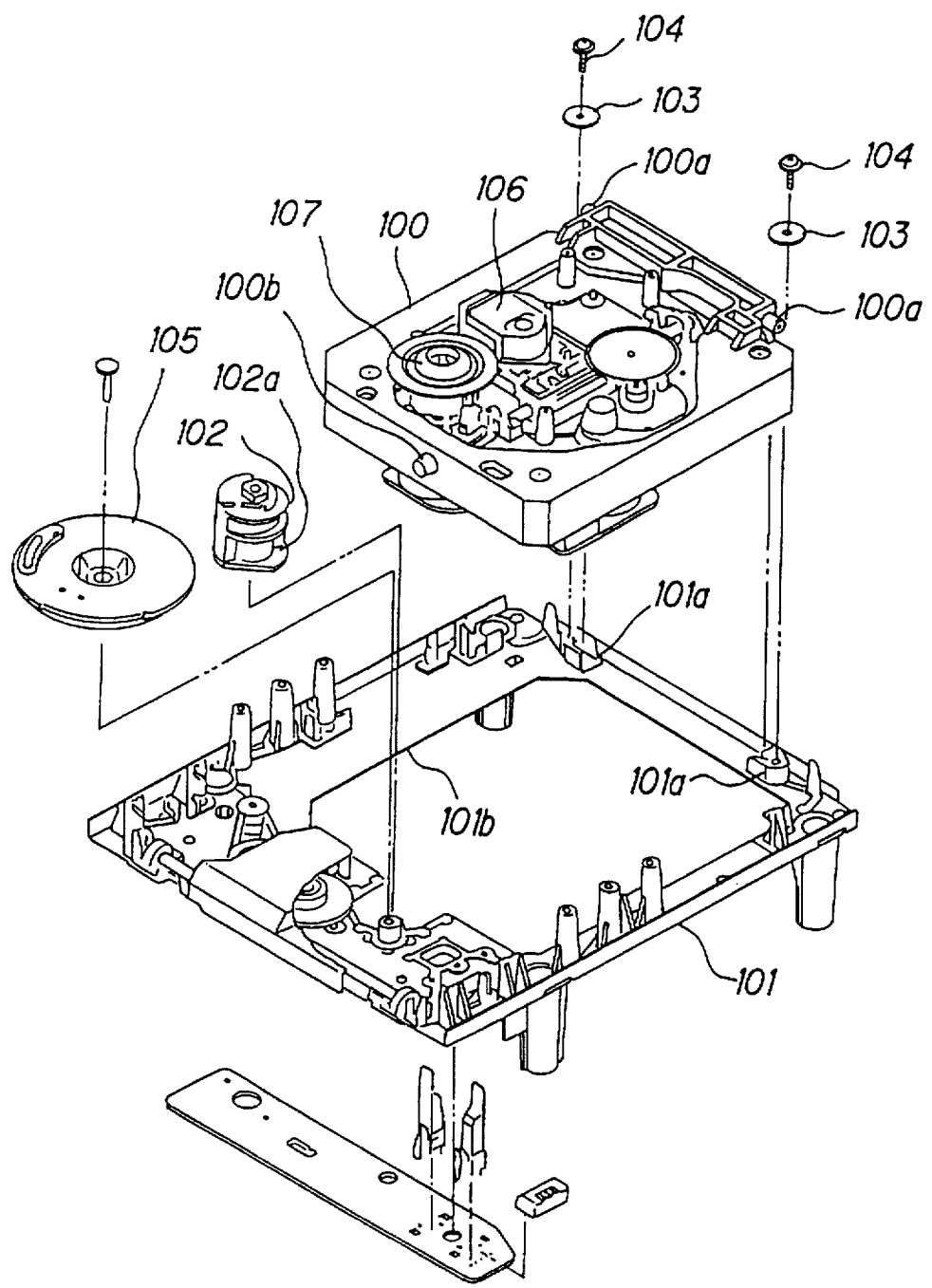
FIG. 1 is a view illustrating the manner in which a prior art disk-loading apparatus is mounted to the main chassis of a CD player.
Figure 2:
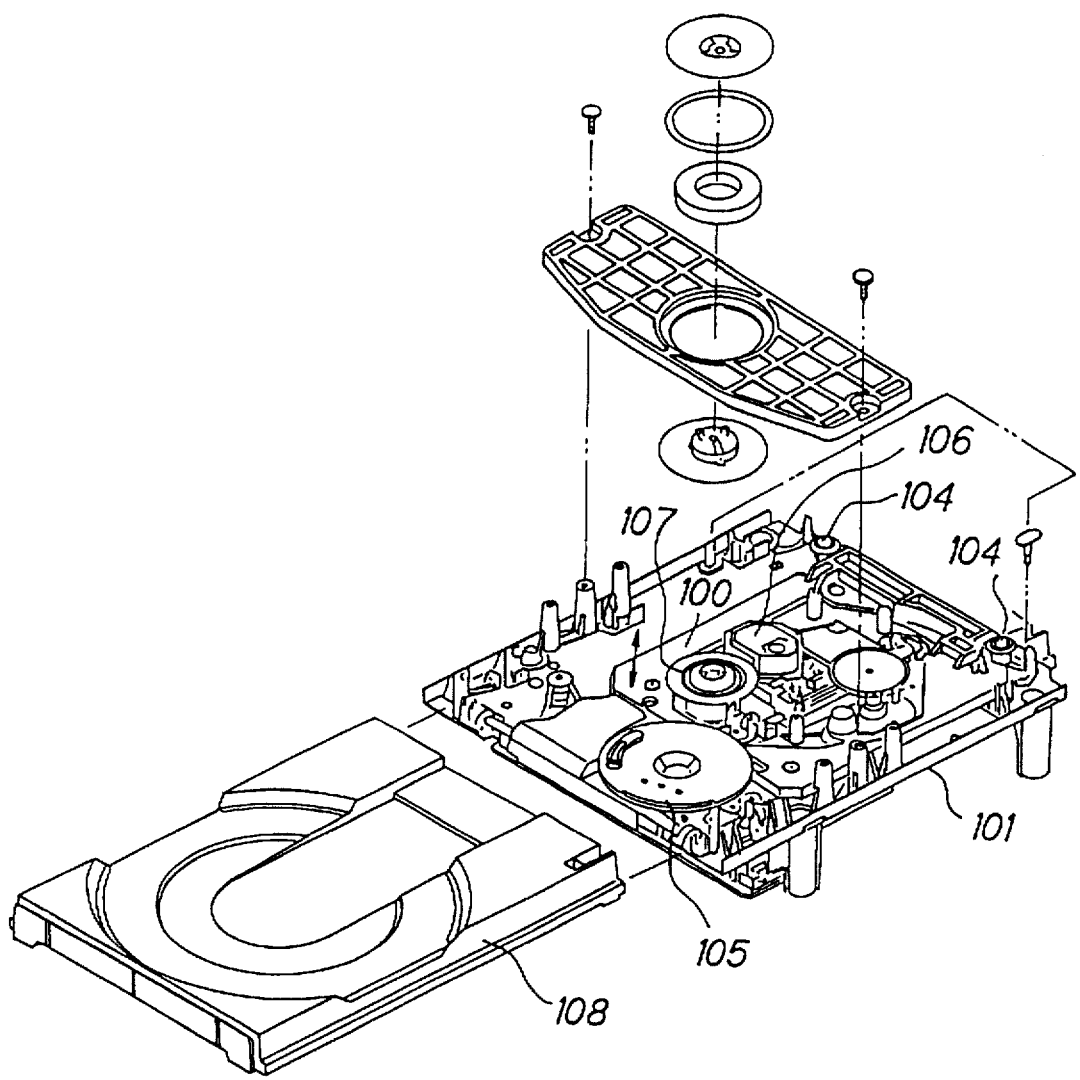
FIG. 2 is an expanded perspective view of main portions of the CD player shown in FIG. 1.

In this way, in this disk-loading apparatus, the subchassis 3 can be mounted to the main chassis without using washers or screws, as in FIGS. 1 and 2 of the prior art. Therefore, the sub-chassis 3 can be mounted easily. Hence, the number of assembly steps can be reduced.

Figure 8:
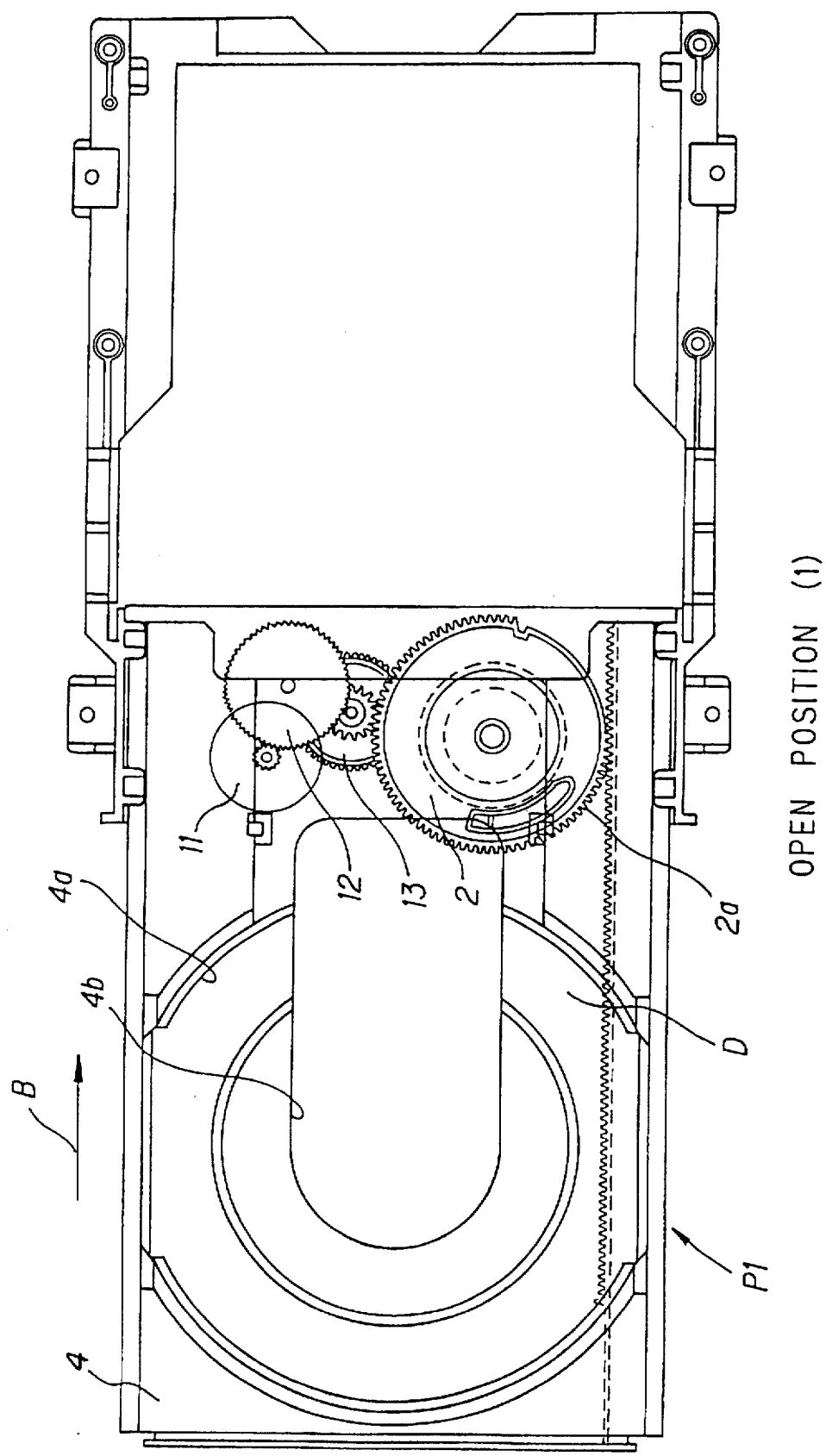
FIG. 8 is a top diagrammatic plan view of the disk-loading apparatus of the invention, also shown in its open position Q1, with greater detail than in FIG. 7.
Figure 9:
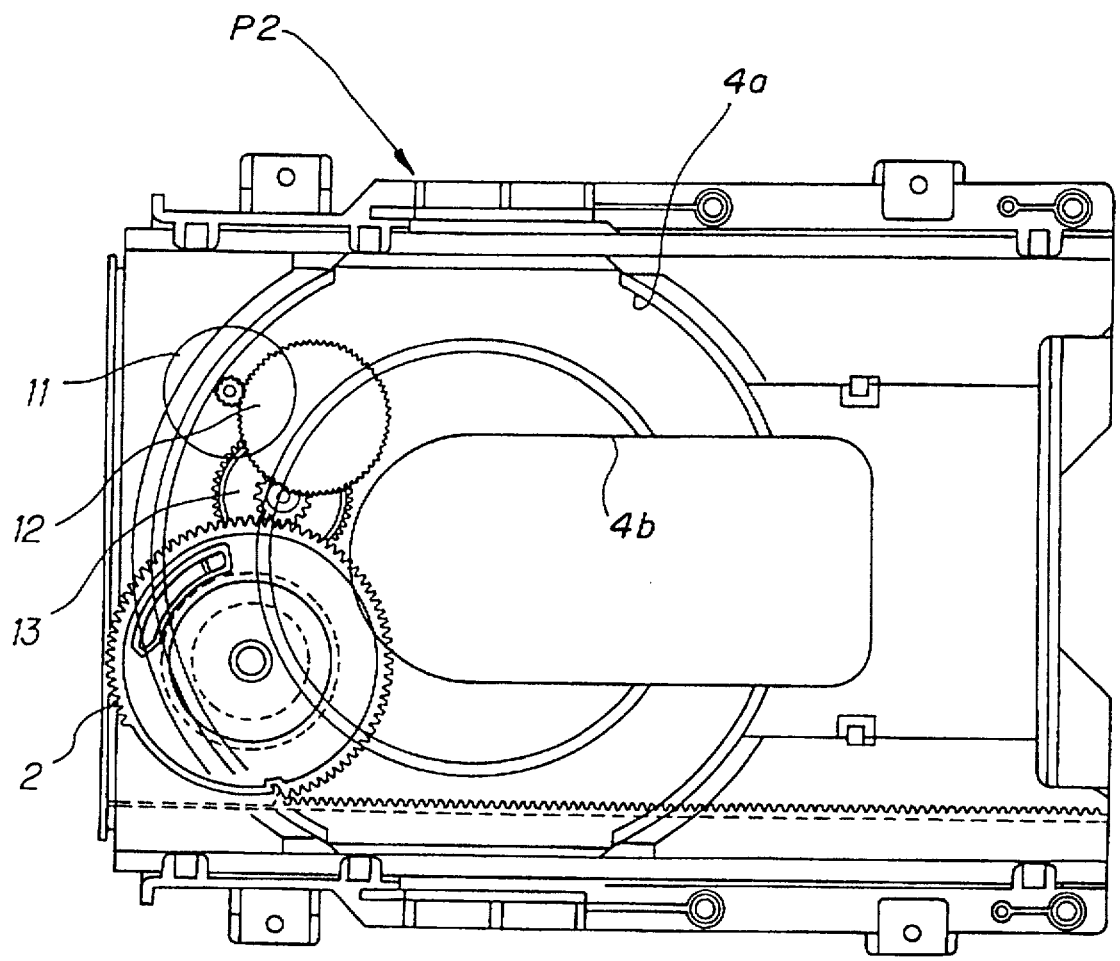
FIG. 9 is a top diagrammatic plan view of the disk-loading apparatus of the invention, similar to FIG. 8, but shown in its closed or standby position (Q2)
Figure 10:
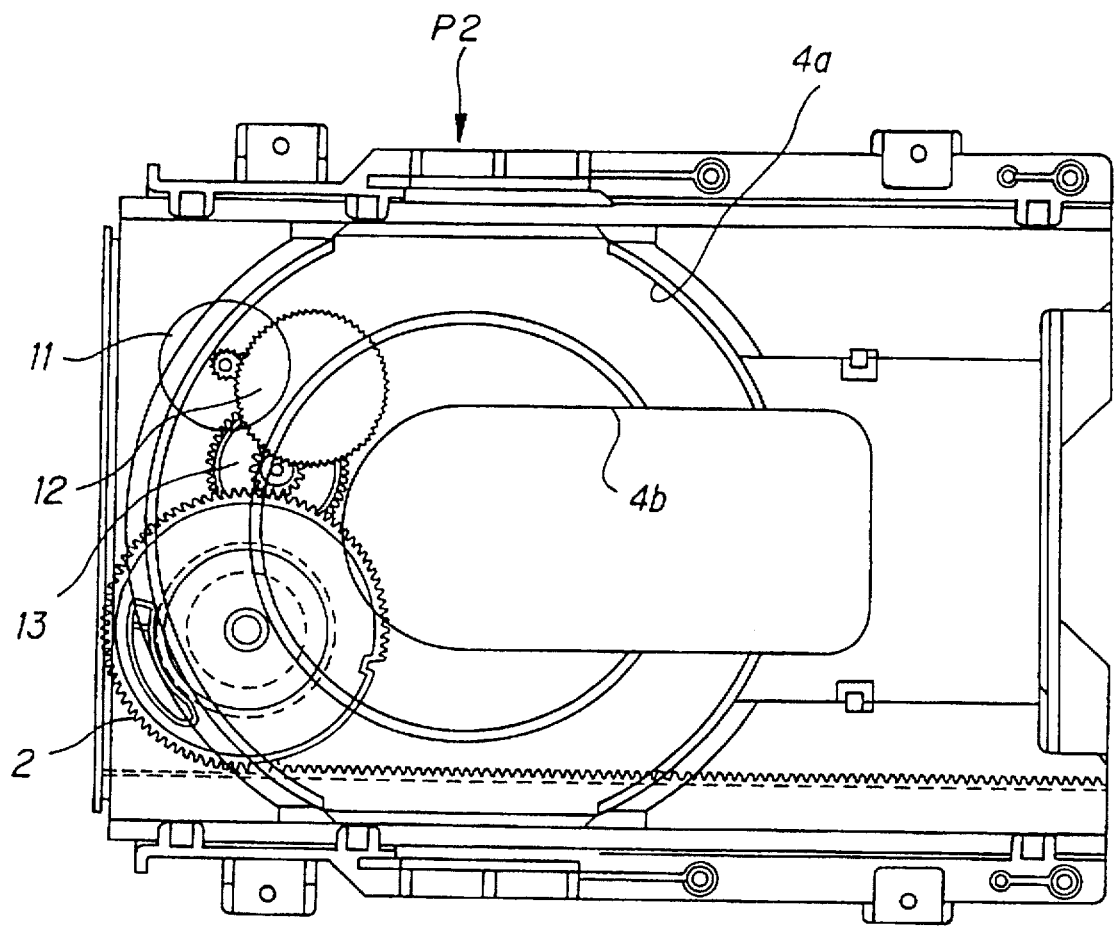
FIG. 10 is a top diagrammatic plan view of the disk-loading apparatus of the invention, similar to FIGS. 8 and 9, but shown in its playback position (Q3) in which the front side of the subchassis is raised.

FIGS. 8 to 10 clarify the positioning of the disk tray 4 for the open position Q1 (FIG. 8), the closed, standby position Q2 (FIG. 9), and the playback position (FIG. 10), wherein the front side of the sub-chassis 3 is in a raised position. The positions Q1, Q2, and Q3 are correlated with the movement of the protrusion 3b in the cam groove 2b from the lower step portion S1 through the oblique or transition portion S3 to an upper step portion S2, as seen in FIG. 6.

Furthermore, the disk-loading apparatus according to the invention dispenses with the need for washers and screws, thus reducing the number of components. This, in turn, lowers the cost of the apparatus. Moreover, in this disk-loading apparatus, variations in quality attributable to tightening screws, i.e., floating of screws, screw induced cracks, and similar phenomena, do not occur. In consequence, the quality of the apparatus is stable and the reliability of the apparatus can be enhanced.

Further, in this disk-loading apparatus, the limiting means for preventing the sub-chassis 3 from disengaging from the main chassis 1 can be made of the limiting protrusions 1f that are parts of the main chassis 1, i.e., simple structures. This can facilitate manufacturing the limiting means. The limiting means may also be formed on the sub-chassis 3.

The operation of the CD player, mainly the operation of the disk-loading apparatus, is now described. When the tray 4 is in the open position P1 shown in FIGS. 7 and 11, if the motor 11 is rotated in a forward direction, the cam gear 2 rotates in the direction indicated by the arrows in FIGS. 5 and 6. The tray 4 is brought into the closed position P2 shown in FIGS. 7 and 10.

In this case, the protrusion 3b on the sub-chassis 3 is brought into the standby position Q2 located immediately before the oblique portion S3 of the lower step portion S1 of the cam groove 2b, as shown in FIG. 6. Then, the motor 11 rotates forwardly. The protrusion 3b on the sub-chassis 3 is placed in position on the upper step portion S2 (hereinafter referred to as the playback position Q3) through the oblique portion S3 in the cam groove 2b from the standby position Q2 shown in FIG. 6.

Therefore, as, the sub-chassis 3 is raised from the tilted position shown in FIG. 11, and the disk D lying on the disk placement portion 4a of the tray 4 is raised by the turntable 6. The disk D is urged toward the chucking pulley 15 by the turntable 6 and so the disk is rotated with the pulley 15 by rotation of the turn-table 6. When the sub-chassis 3 assumes its horizontal position, the optical pickup 7 is placed in position close to the disk D. Therefore, as the disk D turns, information in the disk D is optically read by the optical pickup 7.

When the protrusion 3b on the sub-chassis 3 is moving from the standby position Q2 to the playback position Q3, the tray 4 does not move, because the cam gear 2 is not in mesh with the rack of the tray 4. When the playback of the disk D ends, the motor 11 is reversed. The protrusion 3b on the sub-chassis 3 moves from the playback position Q3 to the standby position Q2. Consequently, the front side of the sub-chassis 3 is tilted downward as shown in FIG. 11. The turntable 6 and other components are pulled downward. As a result, the disk D is placed on the disk placement portion 4a of the tray 4. If the motor 11 is rotated in reverse, the protrusion 3b moves through the lower step portion S1 of the cam groove 2b from the standby position Q2 toward the start position Q1 while the front side of the sub-chassis 3 remains tilted downward.

When the protrusion 3b on the sub-chassis 3 arrives at the start position Q1, the tray 4 is placed in the open position P1, where the tray has been driven out of the main chassis 1. For this reason, if the tray 4 is located in the open position P1, the protrusion 3b on the sub-chassis 3 does not disengage from the notch 2c in the cam groove 2b. In this way, in this disk-loading apparatus, the cam gear 2 for swinging the sub-chassis 3 is also capable of moving the tray 4. In consequence, the timing at which the tray 4 is moved and the timing at which the sub-chassis 3 is swung can be easily determined.

As described thus far, according to the present invention, an inexpensive disk-loading apparatus having a sub-chassis which can be readily mounted to the main chassis is provided.

What is claimed is:

1. An apparatus for loading a disk, comprising:
   a main chassis including:
      an opening;
      first and second protruding portions protruding into said opening, said first and second protruding portions being formed at a first end of the main chassis, said first protruding portion formed immediately adjacent a first side of said chassis, said second protruding portion being formed a predetermined distance inboard from a second side of said chassis;
      first and second support holes respectively formed in said first and second protruding portions, said first and second support holes extending in the same lateral direction and having openings which face a common side of said chassis;
   a sub-chassis which is disposed in said opening and which is pivotally supported on said main chassis, by two pivot shafts which both point in the same lateral direction away from a first side of said sub-chassis and which are respectively inserted into said first and second support holes by lateral motion of said sub-chassis in a direction in which said pivot shafts point; and
   limiting means for limiting a motion of said sub-chassis in a direction opposite to the direction in which said pivot shafts point.

2. An apparatus for loading a disc, comprising:
   a main chassis including:
      an opening;
      first and second protruding portions protruding into said opening, said first and second protruding portions being formed at a first end of the main chassis, said first protruding portion formed immediately adjacent a first side of said chassis, said second protruding portion being formed a predetermined distance inboard from a second side of said chassis;
      first and second support holes respectively formed in said first and second protruding portions, said first and second support holes extending in the same lateral direction and having openings which face a common side of said chassis;
   a sub-chassis which is disposed in said opening and which is pivotally supported on said main chassis, by two pivot shafts which both point in the same lateral direction away from a first side of said sub-chassis and which are respectively inserted into said first and second support holes; and
   wherein the main chassis further comprises a limiting portion for limiting lateral motion of the sub-chassis in said opening, said limiting portion protruding from the second side of said chassis into said opening by a predetermined amount into proximity of the second protruding portion.

3. An apparatus for loading a disc, comprising:
   a main chassis including:
      an opening;
      first and second protruding portions protruding into said opening, said first and second protruding portions being formed at a first end of the main chassis, said first protruding portion formed immediately adjacent a first side of said chassis, said second protruding portion being formed a predetermined distance inboard from a second side of said chassis;
      first and second support holes respectively formed in said first and second protruding portions, said first and second support holes extending in the same lateral direction and having openings which face a common side of said chassis;
   a sub-chassis which is disposed in said opening and which is pivotally supported on said main chassis, by two pivot shafts which both point in the same lateral direction away from a first side of said sub-chassis and which are respectively inserted into said first and second support holes; and
   wherein the sub-chassis further comprises a limiting portion for limiting a motion of the sub-chassis in a direction opposite to the direction in which said pivot shafts point, said limiting portion protruding a predetermined amount into said opening at a location proximate the second protruding portion.

4. The apparatus of claims 2 or 3, further comprising:
   a tray which is slidably supported on said main chassis and which is adapted to support a disc;
   a cam gear having:

a cam member for swinging said sub-chassis up and down with respect to said main chassis, and a driving gear for driving said tray to slide on said main chassis, and wherein:

said main chassis further comprises a recessed portion in which said cam gear can be disposed; and said sub-chassis further comprises an engaging portion which is engaged with and moved by said cam member.

5. The apparatus of claim 4, wherein said cam member is provided with a guide groove into which the engaging portion is inserted, said guide groove having a notch which allows entry of said engaging portion into said guide groove.

6. The apparatus of claim 5, wherein the guide groove of said cam member comprises a first guide groove portion which maintains the sub-chassis in the same position and a second guide groove portion for inducing the sub-chassis to swing up and down with respect to said main chassis.

7. The apparatus of claim 6, wherein said tray is formed with a rack and the driving gear on said cam gear comprises a first toothed portion which meshes with the rack and a second smooth portion which does not mesh with the rack.

8. The apparatus of claim 7, wherein:

the first portion of the driving gear meshes with the rack while the engaging portion slides in the first guide groove portion and the sub-chassis is prevented from pivoting, and the second portion of the driving gear faces the rack while the engaging portion slides in the second guide groove portion and the sub-chassis is induced to swing with respect to said main chassis.

9. A disk-loading apparatus comprising:

a main chassis for supporting a tray on which a disk is placed;

a sub-chassis which is pivotally supported on said main chassis by shafts which point in the same direction;

support means formed on said main chassis for rotatably supporting said shafts, said support means including openings into which said shafts can be simultaneously inserted by a single movement in a lateral direction of said sub chassis, said lateral direction being a direction in which said shafts point with respect to said sub-chassis; and limiting means for preventing said shafts of said sub-chassis from disengaging from said openings in a range of cam induced pivoting of said sub-chassis with respect to said main chassis.

10. The disk-loading apparatus of claim 9, wherein said limiting means consists of a protruding portion formed on one of said sub-chassis and said main chassis.

11. A disk-loading apparatus comprising:

a main chassis for supporting a tray on which a disk is placed;

a sub-chassis which is pivotally supported on said main chassis by shafts which point in the same direction; and support means formed on said main chassis for rotatably supporting said shafts, said support means including openings into which said shafts can be simultaneously inserted by a single movement of said sub-chassis with respect to said main chassis, and for enabling said sub-chassis to be attached to said main chassis without fastening means;

wherein said sub-chassis has an engaging portion for engagement with a cam which is rotatably supported in a recessed portion formed in said main chassis, and wherein said recessed portion is provided with a slot guiding the engaging portion of said sub-chassis and through which the engaging portion extends into the recessed portion and engages with the cam.

12. The disk-loading apparatus of claim 11, wherein the cam has a cam grove and a notch through which the engaging portion of said sub-chassis enters into the cam groove.

13. The disk-loading apparatus of claim 11, wherein said support means includes limiting means for preventing said shafts of said sub-chassis from disengaging from said openings within a range of cam induced pivoting of said sub-chassis with respect to said main chassis.

14. The disk-loading apparatus of claim 11, further comprising means for moving the tray with respect to said main chassis, said moving means including a drive gear formed integrally with said cam.

15. The disk-loading apparatus of claim 14, wherein said moving means for moving the tray with respect to said main chassis further includes a rack which is formed integrally with said tray, said rack meshing with the drive gear of said cam.

* * * * *